United States Patent
Ratmansky

(10) Patent No.: US 12,175,627 B2
(45) Date of Patent: Dec. 24, 2024

(54) ADAPTIVE SUPER-SAMPLING BASED ON GAZE

(71) Applicant: Meta Platforms Technologies, LLC, Menlo Park, CA (US)

(72) Inventor: Irad Ratmansky, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 13 days.

(21) Appl. No.: 17/356,956

(22) Filed: Jun. 24, 2021

(65) Prior Publication Data
US 2024/0054604 A1   Feb. 15, 2024

(51) Int. Cl.
| | |
|---|---|
| G06T 3/4053 | (2024.01) |
| G06F 3/01 | (2006.01) |
| H04N 13/00 | (2018.01) |
| H04N 13/111 | (2018.01) |
| H04N 13/15 | (2018.01) |
| H04N 13/332 | (2018.01) |
| H04N 13/383 | (2018.01) |

(52) U.S. Cl.
CPC ............ *G06T 3/4053* (2013.01); *G06F 3/013* (2013.01); *H04N 13/111* (2018.05); *H04N 13/15* (2018.05); *H04N 13/332* (2018.05); *H04N 13/383* (2018.05); *H04N 2013/0077* (2013.01)

(58) Field of Classification Search
None
See application file for complete search history.

(56) References Cited

U.S. PATENT DOCUMENTS

| | | | | |
|---|---|---|---|---|
| 6,094,453 | A * | 7/2000 | Gosselin | H04N 19/80 375/E7.193 |
| 2001/0055025 | A1* | 12/2001 | Deering | G06T 5/002 345/611 |
| 2015/0379734 | A1* | 12/2015 | Golas | G06T 15/005 345/597 |
| 2017/0263046 | A1* | 9/2017 | Patney | G06T 15/20 |

(Continued)

OTHER PUBLICATIONS

"Equation/Technique for Shifting an IGN Pattern," created on Jan. 22, 2015, [Retrieved on Aug. 30, 2021], 2 Pages, Retrieved from the Internet: URL: https://www.shadertoy.com/view/4tXGWN.

(Continued)

*Primary Examiner* — Jason A Pringle-Parker
(74) *Attorney, Agent, or Firm* — Morgan, Lewis & Bockius LLP

(57) ABSTRACT

In one embodiment, a method includes determining a gaze direction of a user wearing a head-mounted device, the head-mounted device having a display configured to output an image having multiple of pixels. The method may further include determining, for each of the multiple pixels, a set of sampling locations based on the gaze direction of the user, the sets of sampling locations of the multiple pixels being a portion of a sampling pattern defined based on the gaze direction of the user. In one embodiment, the method may also include computing, for each of the multiple pixels, a color value for the pixel by sampling a scene according to the set of sampling locations associated with the pixel, generating the image using the color values of the multiple pixels, and outputting the image using the display of the head-mounted device.

16 Claims, 8 Drawing Sheets

(56) References Cited

U.S. PATENT DOCUMENTS

| | | | | |
|---|---|---|---|---|
| 2018/0107271 A1* | 4/2018 | Woo | | G06F 3/013 |
| 2018/0293694 A1* | 10/2018 | Labbe | | G06T 15/80 |
| 2018/0357749 A1* | 12/2018 | Young | | G09G 5/001 |
| 2018/0357752 A1* | 12/2018 | Ho | | G09G 5/377 |
| 2019/0318709 A1* | 10/2019 | Wicks | | G09G 5/373 |
| 2020/0184933 A1* | 6/2020 | Nijs | | G06T 5/002 |
| 2020/0372700 A1* | 11/2020 | Davies | | G16H 30/40 |
| 2021/0366082 A1* | 11/2021 | Xiao | | G06T 7/246 |

OTHER PUBLICATIONS

Georgiev I., et al., "Blue Noise Sampling Pattern," Arnold Renderer, Jul. 2016, 1 Page, Retrieved from the Internet: URL: https://www.arnoldrenderer.com/research/dither_abstract.pdf.

"Presentation on Interleaved Gradient Noise (IGN) Patterns," published on Aug. 28, 2014, 161 slides, Retrieved from the Internet: URL: http://www.iryoku.com/downloads/Next-Generation-Post-Processing-in-Call-of-Duty-Advanced-Warfare-v18.pptx.

Wikipedia: "Ordered Dithering," last edited on Aug. 13, 2021, [Retrieved on Aug. 30, 2021], 5 Pages, Retrieved from the Internet: URL: https://en.wikipedia.org/wiki/Ordered_dithering.

Wikipedia: "Super Sampling," last edited on Mar. 24, 2021, [Retrieved on Aug. 27, 2021], 5 Pages, Retrieved from the Internet: URL: https://en.wikipedia.org/wiki/Supersampling#:~:text=Supersampling%20or%20supersampling%20anti%2Daliasing,computer%20programs%20that%20generate%20imagery.

* cited by examiner

ADAPTIVE SUPER-SAMPLING BASED ON GAZE

TECHNICAL FIELD

This disclosure generally relates to computer graphics and more specifically to system and methods for supersampling.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Devices such as wearable head-mounted visual displays for augmented or virtual reality (AR/VR) applications face unique challenges. AR/VR applications are expected to give users the perception of being immersed in an alternative reality. However, due to their limited system resources (e.g., battery, compute, memory, etc.), AR/VR devices have to limit the resolution of the rendered images. In addition, like traditional displays, AR/VR devices use pixels to visualize AR/VR content to users, which means that the visualized content is susceptible to aliasing artifacts if left uncorrected.

SUMMARY OF PARTICULAR EMBODIMENTS

Super-sampling is an effective technique to provide an improved perception and anti-aliased image. For AR/VR headsets that have limited pixels-per-degree, super-sampling can be used to boost the perceived quality of images. Super-sampling is also an effective way to reduce aliasing artifacts. Aliasing occurs because visual displays are often comprised of pixels, which are typically small square increments of the display. Being square in shape, pixels can effectively display shapes that have straight edges which fit neatly along the straight edged border of a pixel. However, difficulties arise when displaying images with curved borders or images that run diagonally and require displaying through a diagonal section of pixels within a digital display. This undesirable visual affect may be described as aliasing. Visual displays may apply anti-aliasing techniques such as super-sampling which allows for the averaging of the colors of pixels at the boundary of an image, which may alleviate the stepped or jagged edges of an aliased image. Anti-aliasing techniques such as super-sampling may help to make images appear smoother and thus more realistic to the viewer.

In particular embodiments, visual display systems may utilize specific patterns of pixel color gradients when super-sampling to alleviate aliasing or other undesirable visual effects. The proper design of the sampling patterns may help to alleviate underinsured visual artifacts within the visual display such as aliasing or visual noise. Visual noise may appear on a display as undesired variations in texture, brightness, and color within the displayed image. Such visual noise may come in the form of graininess, salt-and-pepper, and banding among others. When displayed to and perceived by the human visual system, sampling patterns ideally make the image appear more pleasing or realistic to the viewer which is accomplish in part by mitigating or eliminating any visual artifacts, including visual artifacts attributable to the sampling pattern.

Due to limited system resources, the number of samples taken and their placement need to be carefully designed to allow the system to render at the desired framerate. When super-sampling, the final color of each pixel is determined based on multiple samples. For example, the content within a pixel may be sampled according to a sampling pattern (or noise pattern), and the sampled colors may be blended to determine the final color of that pixel. The sampling pattern may specify a finite (e.g., 2, 4, 7, 11, etc.) number of samples per pixel. Some sampling patterns may be statically defined relative to the display. For example, traditional visual displays such as televisions may benefit from utilizing super-sampling and sampling patterns which are fixed to the television display screen. This means that the specific location and pattern of pixel color gradients within the sampling pattern are always displayed in the same location and orientation relative to the visual display. Such a fixed pattern may yield some levels of banding, but it may be sufficient in the traditional television-viewing context since users that view the television display are typically viewing from distances of at least a few feet away from the screen. Also, users viewing the television are typically keeping their head fixed and not rotating while viewing the display.

Alternatively, the placement of the sampling locations may vary in space and time, meaning that the sampling pattern may change for every pixel and over time. However, the placement of the samples needs to be carefully designed to avoid introducing undesired artifacts. For example, random placement of the samples would lead to noise, which is particularly distracting for the human visual system. In traditional display contexts (e.g., traditional 2D displays, such as television, monitors, etc.), Interleaved Gradient Noise (IGN) combined with spiral sampling patterns usually leads to great results. As the virtual camera rotates around the world, the sampling pattern rotates smoothly in a dithering pattern which is pleasant to the human eye. In addition, the motion matches the rotation velocity of the camera. This means that when the camera is stationary, the sampling pattern does not change, thus leading to image stability.

Unfortunately, these properties of IGN do not carry over to AR/VR because of the Vestibulo-Ocular Reflex (VOR) effect, which is the human reflex of counter-rotating the eyes compared to head motion as a response for a stimulation. In other words, the VOR allows users of AR or VR to rotate their heads and still maintain their gaze on the target content. While the user's head is rotating, the world-locked target content would travel across the display. As such, if the sampling pattern used is static relative to the display or only adapts to the user's head motion, the target object would be sampled using different sampling patterns as it travels across the display. However, due to VOR, when the user is moving his head and looking at an object, his eyes could remain fixed on the target object, which means the user would observe the target object being sampled using different patterns without the desired properties. This, in turn, would make the sampling pattern very noticeable and distracting (e.g., shimmering). Moreover, unlike more traditional visual displays, head mounted devices are positioned close to the user's gaze where the distance from the users' eyes to the display screen may only be a couple inches or less. As a result, users' eye angular movement relative to the display screen may be fairly large especially compared to users' viewing a more traditional display from a farther distance from the screen. Consequently, users of head mounted displays may scan a large portion of the display screen in a short period of time with little eye movement, and this may cause users to scan through large portions of the sampling pattern used, which further exacerbates the unwanted effect.

To address the aforementioned issues attributable to VOR, embodiments described herein use eye-tracking to dynamically shift the sampling patterns used. As an example and not by way of limitation, such visual displays may benefit from systems which fix the sampling pattern to the gaze direction of the user.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
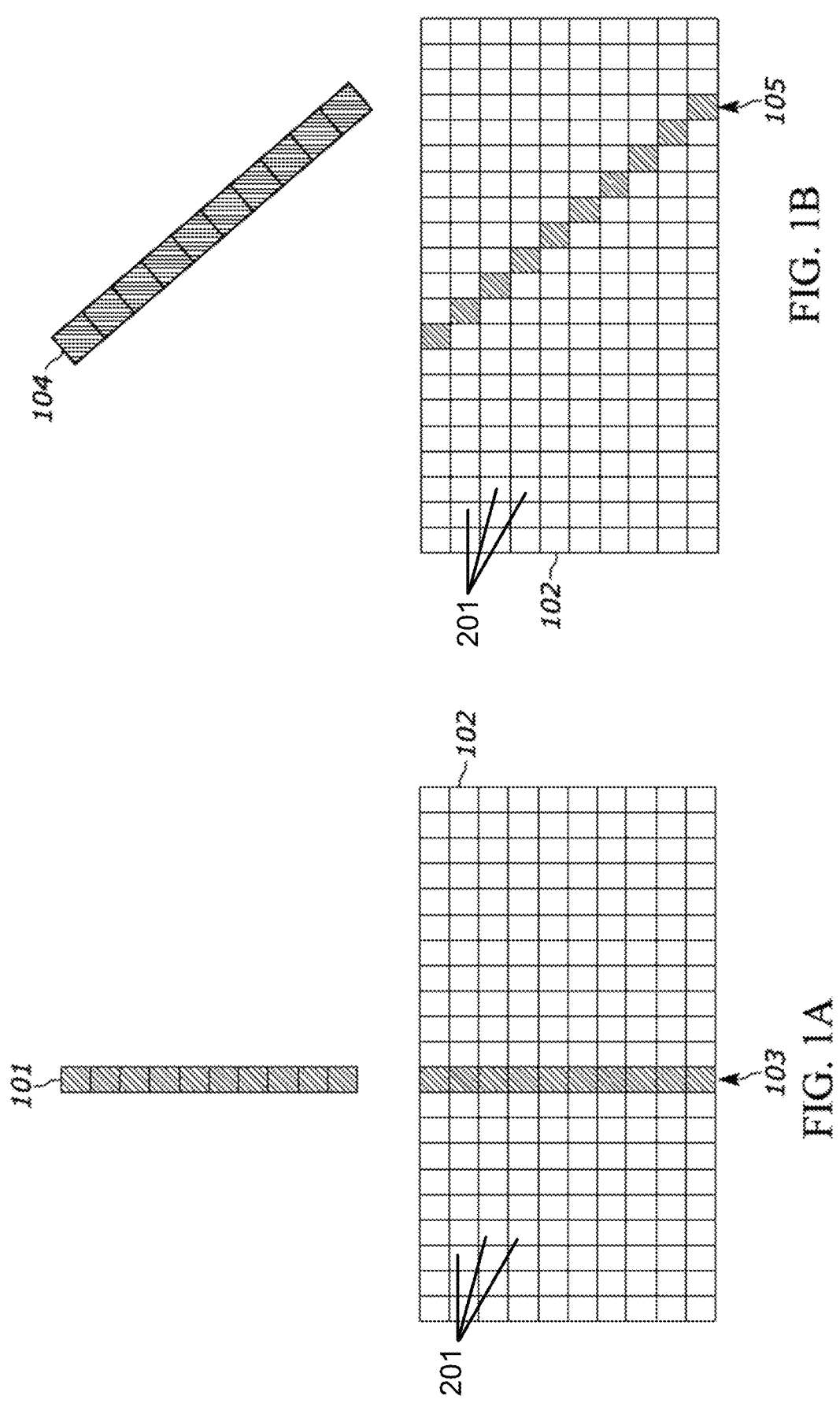
FIGS. 1A-1B illustrate example aliasing artifacts that could be corrected using super-sampling.

Artificial reality may be embodied as one or more of an augmented reality, virtual reality, or mixed reality. The processing capabilities of artificial reality systems may be limited. Therefore to improve upon the efficiency of the artificial reality system's image processing, super-sampling may be used to generate output images. Additionally, the use of super-sampling and sampling patterns may need to be modified when applied to visual displays of artificial reality systems which may come in the form of wearable head mounted devices. Although the sampling of images may be described in context of an artificial reality system, the sampling described herein may be applied generally to images captured or generated by a plurality of devices.

In particular embodiments, a computing system may determine a gaze direction of a user wearing a head-mounted device, the head-mounted device having a display configured to output an image having a plurality of pixels. As an example and not by way of limitation, the head-mounted device may be part of a virtual reality (VR) or an augmented reality (AR) system. In particular embodiments, the gaze direction of the user may be determined based on eye-tracking data captured by one or more sensors of the head-mounted device. Although this disclosure describes and illustrates determining a gaze direction of a user wearing a head-mounted device in a particular way, this disclosure contemplates any suitable way of determining a gaze direction of a user wearing a head-mounted device.

In particular embodiments, the computer system may determine for each of the plurality of pixels, a set of sampling locations based on the gaze direction of the user, the sets of sampling locations of the plurality of pixels being a portion of a sampling pattern defined based on the gaze direction of the user. In particular embodiments, the computer system may determine a gaze location on the display based on the gaze direction of the user, wherein the set of sampling locations for each of the plurality of pixels is determined based on the gaze location, and the sampling pattern is defined relative to the gaze location. In particular embodiments, the set of sampling locations associated with each of the plurality of pixels may be procedurally generated based on a location of the pixel and the gaze location. As an example and not by way of limitation, determining the gaze location may comprise determining a gaze angle between the gaze direction and an optical axis of an eye of the user, determining a distance between the eye and the display along the optical axis of the eye, and calculating, based on the gaze angle and the distance, an offset between (1) a location on the display intersected by the optical axis of the eye and (2) the gaze location. In particular embodiments, the sampling pattern tracks the gaze location. In particular embodiments, the sampling pattern is fixed relative to the gaze location. In particular embodiments, the set of sampling locations associated with each of the plurality of pixels are used for reducing aliasing artifacts in the image. As an example and not by way of limitation, the aliasing artifacts may include jagged or swirling lines, any type of visual noise such as salt and pepper or graininess, or visual banding or any type or combination of types of aliasing artifacts. Although this disclosure describes and illustrates determining, for each of the plurality of pixels, the set of sampling locations based on the gaze direction of the user in a particular way, this disclosure contemplates any suitable way of determining, for each of the plurality of pixels, the set of sampling locations based on the gaze direction of the user.

In particular embodiments, the computer system may compute, for each of the plurality of pixels, a color value for the pixel by sampling a scene according to the set of sampling locations associated with the pixel. As an example and not by way of limitation, the sampling may include the implementation of any super-sampling, sampling pattern or any other suitable sampling techniques. As an example and not by way of limitation, the sampling pattern may be an Interleaved Gradient Noise pattern. As another example and not by way of limitation, the sampling pattern may be a blue noise pattern or a dithering pattern. Although this disclosure describes and illustrates computing, for each of the plurality of pixels, a color value for the pixel by sampling a scene according to the set of sampling locations associated with the pixel in a particular way, this disclosure contemplates any suitable way of computing, for each of the plurality of pixels, a color value for the pixel by sampling a scene according to the set of sampling locations associated with the pixel.

In particular embodiments, the computer system may generate the image using the color values of the plurality of pixels and output the image using the display of the head-mounted device. Although this disclosure describes and illustrates generating the image using the color values of the plurality of pixels and outputting the image using the display of the head-mounted device in a particular way, this disclosure contemplates any suitable way of generating the image using the color values of the plurality of pixels and outputting the image using the display of the head-mounted device.

FIGS. 1A-1B illustrate example aliasing artifacts. FIG. 1A illustrates an image without aliasing artifacts. FIG. 1A may comprise a target content 101 and a display 102 which may output an example image 103 of the target content 101 having a plurality of pixels 201. In particular embodiments, the target content 101 may fit smoothly within the grid like pattern of the plurality of pixels 201 within the display 102. As an example and not by way of limitation, the target content 101 may be any object, person, or anything that exists which may be displayed on a visual display. As an example and not by way of limitation, the display 102 may be any type of pixelated display which may be used for applications such as but not limited to a televisions, monitors, or head mounted devices. FIG. 1B illustrates an image with aliasing artifacts. FIG. 1B may comprise a target content 104 and the display 102 which may output an example image 105 of the target content 104 having a plurality of pixels 201. In particular embodiments, the target content 104, when rasterized into pixels, may not fit smoothly within the grid like pattern of the plurality of pixels 201 within the display. As a result, the image 105 may have aliasing artifacts such as to have step like lines at its boundaries. As an example and not by way of limitation, aliasing artifacts may include any types of aliasing artifacts such as but not limited to jagged, stepped or wavy lines.

Figure 2:
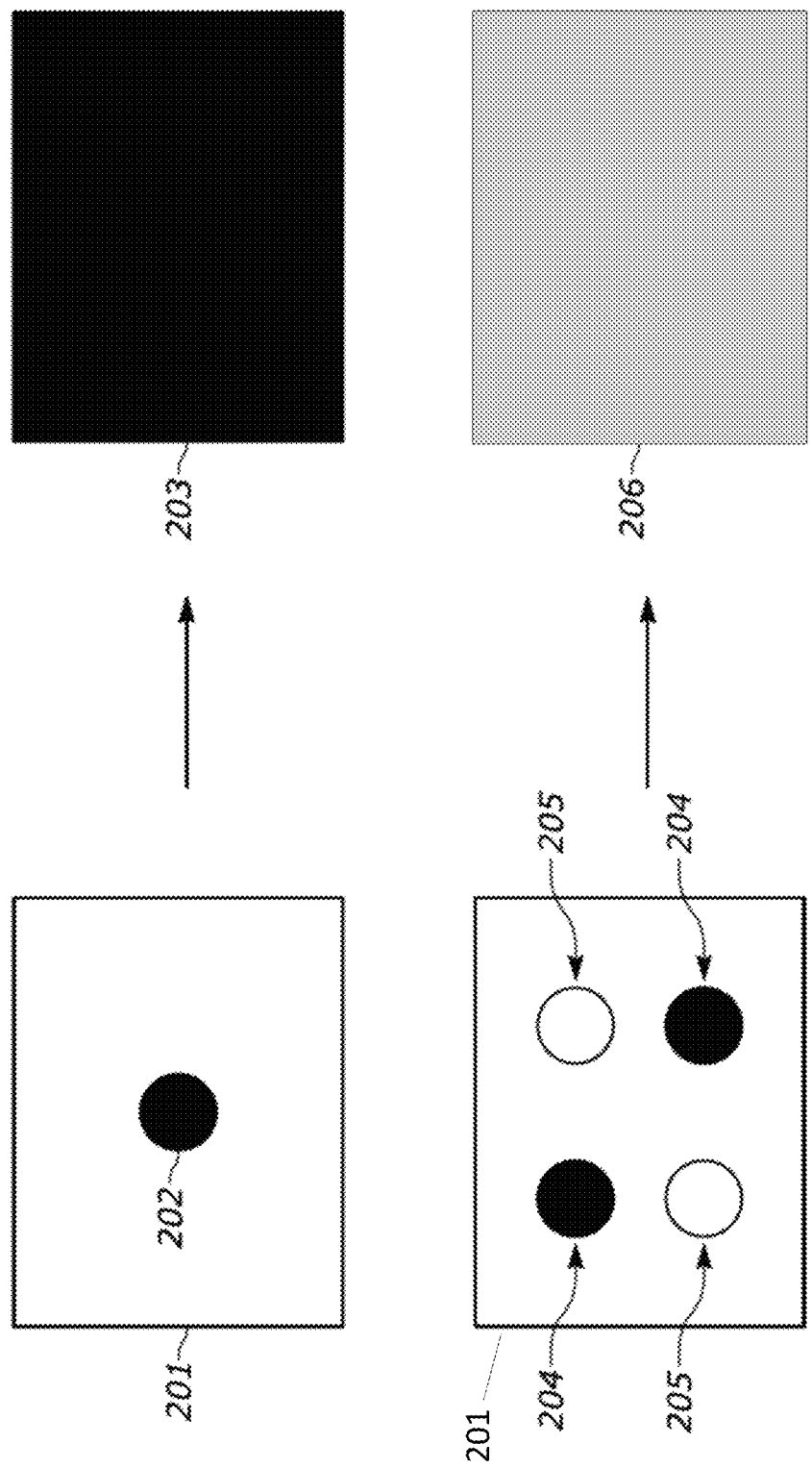
FIG. 2 illustrates super-sampling techniques.

FIG. 2 illustrates super-sampling techniques. For example and not by way of limitation, super-sampling may aid in anti-aliasing an image. FIG. 2 shows a pixel area 201. The pixel area 201 may include any content, which could have varying shades of different colors, but ultimately the pixel value assigned to the pixel can only represent a single color. To determine the pixel value of the pixel, a rendering system could sample one or more locations within the pixel area 201. The number of samples used and the locations of the samples influence the final approximation of the pixel value. For example, if the pixel area 201 is sampled at the center sampling location 202 and the sampled color is black, black would be used as the value for the final pixel 203. In another example, four different sampling locations could be used to sample the pixel area 201. In the bottom example shown in FIG. 2, two sampling locations 204 are black and two other sampling locations are white. When the sampled colors are blended (e.g., an average), a shade of gray would be the value for the final pixel 206. As an example and not by way of limitation, the pixel area 201 may be super-sampled by any number of samples and various locations within the pixel area 201. In particular embodiments, a pixel area 201 which is subject to super-sampling may display an averaged color 206 to help anti-alias an image.

Figure 3:
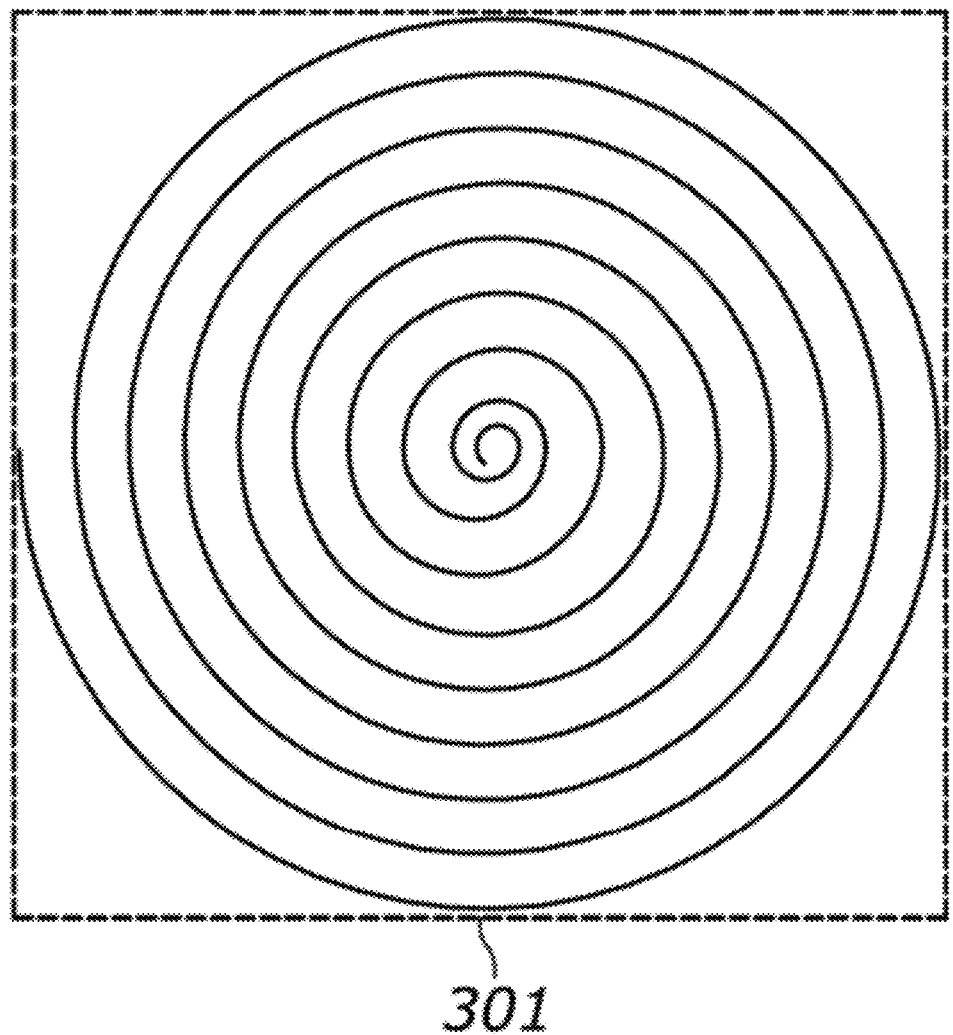
FIG. 3 illustrates an example sampling pattern 301 for removing aliasing artifacts.

FIG. 3 illustrates an example sampling pattern 301 used for super-sampling. In particular embodiments, sampling patterns may be used to anti-alias images. The pattern shown in FIG. 3 provides a conceptual representation of a sampling pattern. The sampling pattern 301 may be comprised of a plurality of variously shaded dots where each dot is a sampling location. As an example and not by way of limitation, the sampling pattern 301 may come in many different types and forms. The sampling pattern 301 may be in the form of an interleaved gradient pattern (IGN), blue noise pattern, random pattern, fixed pattern, or a dithering pattern. In particular embodiments, sampling patterns 301 may be defined within the screen space of a visual display. As an example and not by way of limitation, sampling patterns 301 defined relative to the screen are acceptable for displays within televisions or monitors where users' gaze is generally doesn't change much in relation to the screen. However, this may not be the case for visual displays within head-mounted devices for AR/VR. With head-mounted displays and especially for AR/VR applications, the users' gaze may often scan across the entire display and possibly while locked onto a target content in the real world. This may result in users viewing different regions of the sampling pattern 301 and seeing the target content move to through various regions of the sampling pattern 301. Consequently, the users' eyes may see constantly changing patterns within the display resulting in the user perceiving visual noise such as flickering artifacts and ultimately lower the users' visual experience.

Figure 4A:
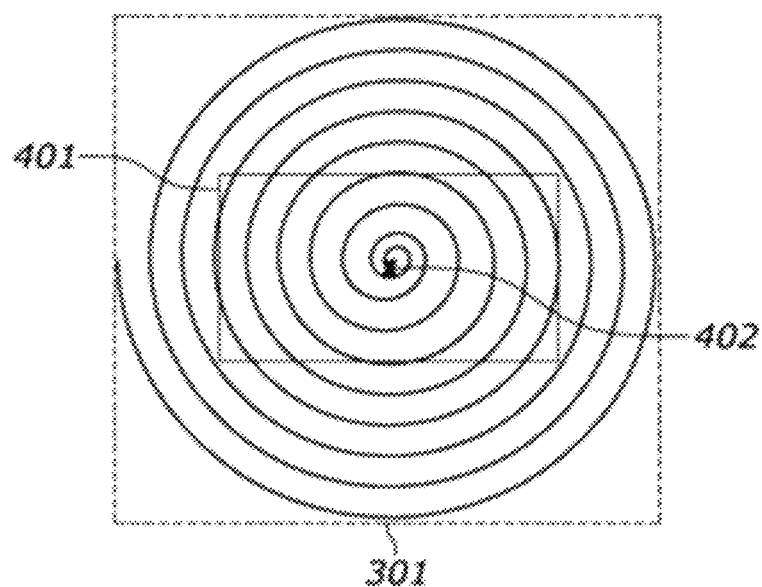
FIGS. 4A-4B illustrate an example head-mounted device display with a sampling pattern defined relative to the user's gaze location.
Figure 4B:
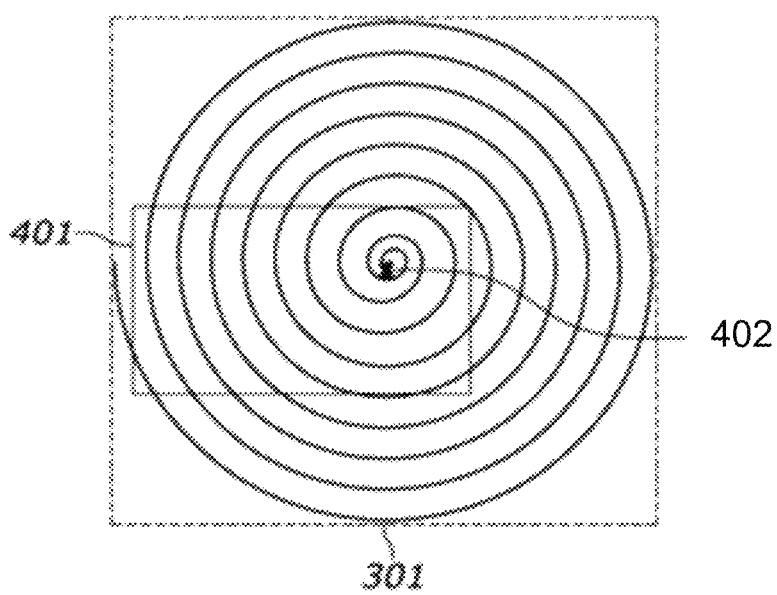

FIGS. 4A-4B illustrate an example head-mounted device display 401 with a sampling pattern 301 defined relative to the user's gaze location 402. FIG. 4A illustrates the sampling pattern 301 defined relative to the user's gaze location 402 when the user is looking at towards the center of the display 401. FIG. 4B illustrates the sampling pattern 301 defined relative to the user's gaze location 402 when the user is looking away from the center of the display 401. In particular embodiments, the gaze direction of the user wearing the head-mounted device may be determined using any suitable eye-tracking device and/or algorithm (e.g., the headset may include small cameras pointed at the user's eyes, and the detected glints reflected from the eyes may be used to estimate the user's gaze). The head-mounted device may have a display 401 configured to output the image having a plurality of pixels 201. In particular embodiments, for each of the plurality of pixels 201, a set of sampling locations based on the gaze direction of the user may be determined, the sets of sampling locations of the plurality of pixels 201 being a portion of a sampling pattern 301 defined based on the gaze direction of the user. In particular embodiments, a gaze location 402 on the display 401 may be determined based on the gaze direction of the user, wherein the set of sampling locations for each of the plurality of pixels 201 is determined based on the gaze location 402, and the sampling pattern 301 is defined relative to the gaze location 402. As an example and not by way of limitation, the set of sampling locations associated with each of the plurality of pixels 201 is procedurally generated based on a location of the pixel 201 and the gaze location 402. In particular embodiments, the portion of the sampling pattern 301 used to generate an image depends on the user's gaze location 402 which allows the orientation of the sampling pattern 301 to remain consistent for the user regardless of where on the display 401 the user is looking. As an example and not by way of limitation, the center of the sampling pattern 301 may be defined at the user's gaze location 402 on the display 401. In particular embodiments, the gaze location 402 on the display 401 may be determined based on the gaze direction of the user wherein the set of sampling locations for each of the plurality of pixels 201 is determined based on the gaze location 402, and the sampling pattern 301 is defined relative to the gaze location. In particular embodiments, the sampling pattern 301 tracks the gaze location 402. In particular embodiments, the gaze direction of the user is determined based on eye-tracking data captured by one or more sensors of the head-mounted device.

Figure 5:
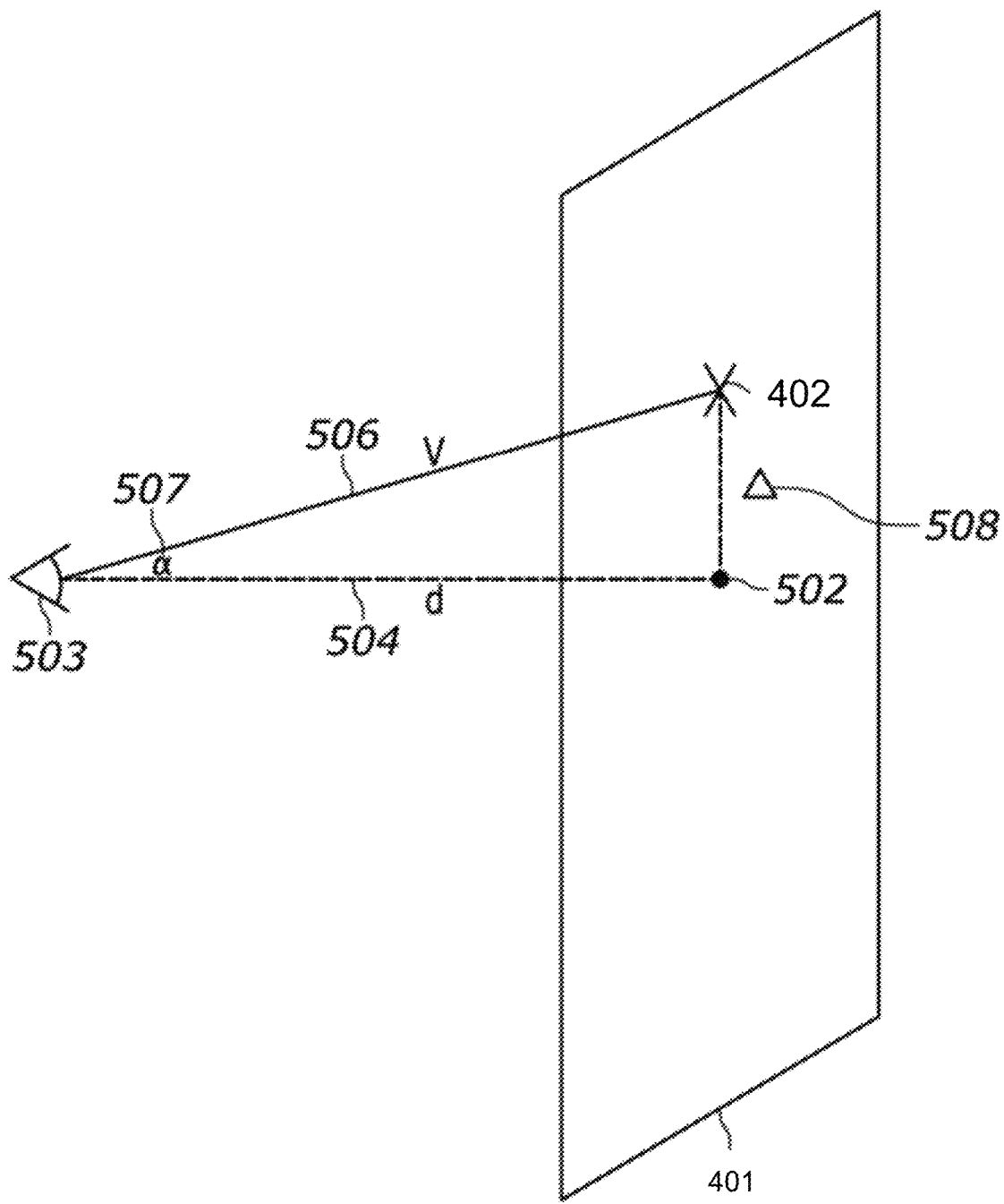
FIG. 5 illustrates an example implementation detail of determining a user's gaze location on the display.

FIG. 5 illustrates an example method of determining a user's gaze location 402 on the display 401. FIG. 5 shows the display 401 and the user's eye 503. In particular embodiments, determining the gaze location 402 may comprise determining the gaze angle ($\alpha$) 507 between the gaze direction 506 and the optical axis 502 of the eye 503 of the user, determining the distance (d) 504 between the eye 503 and the display 401 along the optical axis 502 of the eye 503, and calculating, based on the gaze angle 507 and the distance d 504, an offset ($\Delta$) 508 between (1) a location on the display intersected by the optical axis 502 of the eye 503 and (2) the gaze location 402. As an example and not by way of limitation, the offset ($\Delta$) 508 may be a distance within the display 401 and may be calculated by trigonometric calculations such as but not limited to d $\tan(\alpha)=\Delta$. In particular embodiments, the offset ($\Delta$) 508 may be calculated for both an X and Y axis and be used to determine the location of the sampling pattern 301.

Figure 6:
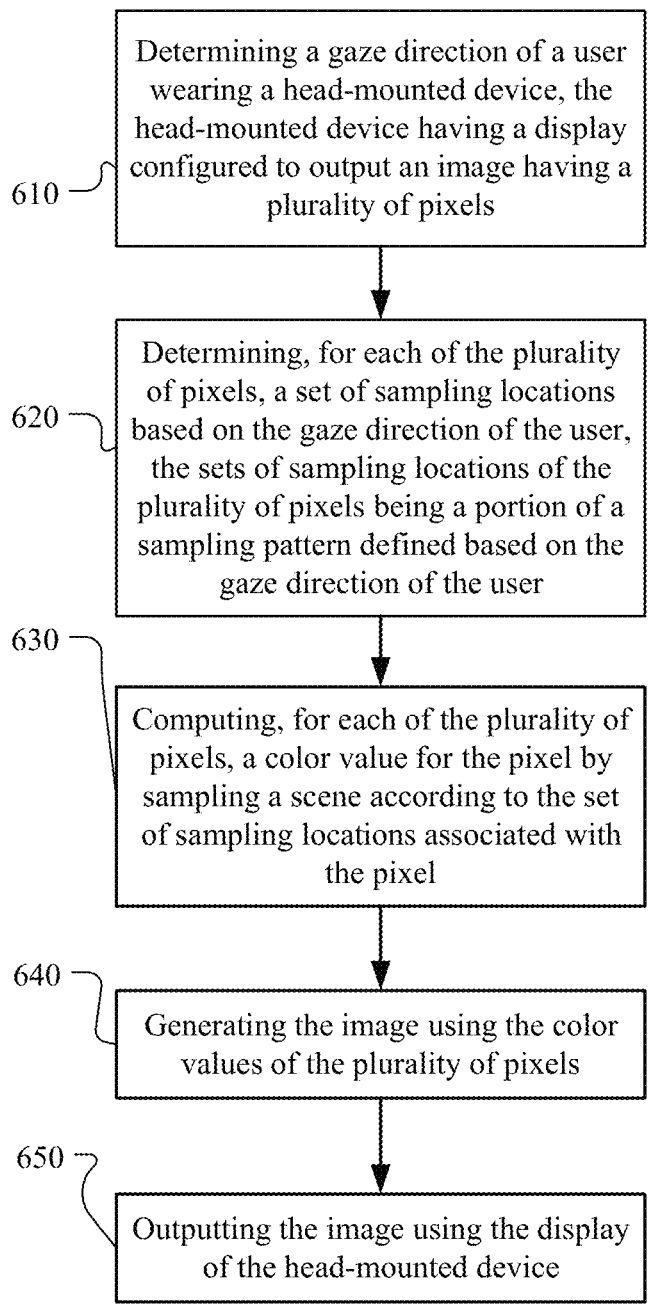
FIG. 6 illustrates an example method for super-sampling using a sampling pattern that adapts to a user's gaze.

FIG. 6 illustrates an example method 600 for fixing a sampling pattern to a user's gaze. The method may be performed by a computing system. At step 610, the computing system may determine a gaze direction of a user wearing a head-mounted device, the head-mounted device having a display configured to output an image having a plurality of pixels. At step 620, the computing system may determine, for each of the plurality of pixels, a set of sampling locations based on the gaze direction of the user, the sets of sampling locations of the plurality of pixels being a portion of a sampling pattern defined based on the gaze direction of the user. At step 630, the computing system may compute, for each of the plurality of pixels, a color value for the pixel by sampling a scene according to the set of sampling locations associated with the pixel. At step 640, the computing system may generate the image using the color values of the plurality of pixels. At step 650, the computing system may output the image using the display of the head-mounted device. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for super-sampling using a sampling pattern that adapts to a user's gaze, including the particular steps of the method of FIG. 6, this disclosure contemplates including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
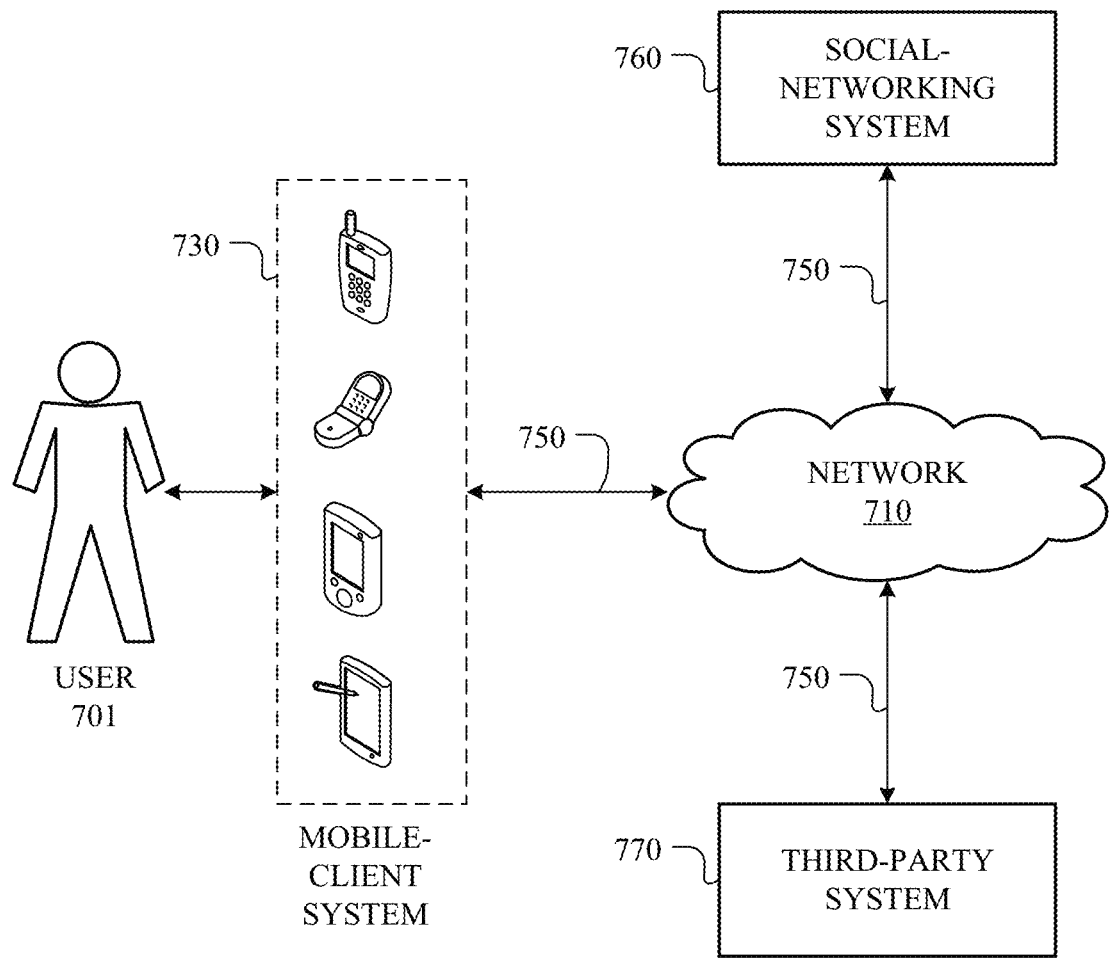
FIG. 7 illustrates an example network environment associated with a social-networking system in which an AR/VR device may be used.

FIG. 7 illustrates an example network environment 700 associated with a social-networking system. Network environment 700 includes a user 701, a client system 730 (e.g., an AR/VR device, mobile device, or any other device with a display), a social-networking system 760, and a third-party system 770 connected to each other by a network 710. Although FIG. 7 illustrates a particular arrangement of user 701, client system 730, social-networking system 760, third-party system 770, and network 710, this disclosure contemplates any suitable arrangement of user 701, client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of users 701, client systems 730, social-networking systems 760, third-party systems 770, and networks 710, this disclosure contemplates any suitable number of users 701, client systems 730, social-networking systems 760, third-party systems 770, and networks 710. As an example and not by way of limitation, network environment 700 may include multiple users 701, client system 730, social-networking systems 760, third-party systems 770, and networks 710.

In particular embodiments, user 701 may be an individual (human user), an entity (e.g., an enterprise, business, or third-party application), or a group (e.g., of individuals or entities) that interacts or communicates with or over social-networking system 760. In particular embodiments, social-networking system 760 may be a network-addressable computing system hosting an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. In particular embodiments, social-networking system 760 may include an authorization server (or other suitable component(s)) that allows users 701 to opt in to or opt out of having their actions logged by social-networking system 760 or shared with other systems (e.g., third-party systems 770), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system through blocking, data hashing, anonymization, or other suitable techniques as appropriate. Third-party system 770 may be accessed by the other components of network environment 700 either directly or via network 710. In particular embodiments, one or more users 701 may use one or more client systems 730 to access, send data to, and receive data from social-networking system 760 or third-party system 770. Client system 730 may access social-networking system 760 or third-party system 770 directly, via network 710, or via a third-party system. As an example and not by way of limitation, client system 730 may access third-party system 770 via social-networking system 760. Client system 730 may be any suitable computing device, such as, for example, a personal computer, a laptop computer, a cellular telephone, a smartphone, a tablet computer, or an augmented/virtual reality device.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

Figure 8:
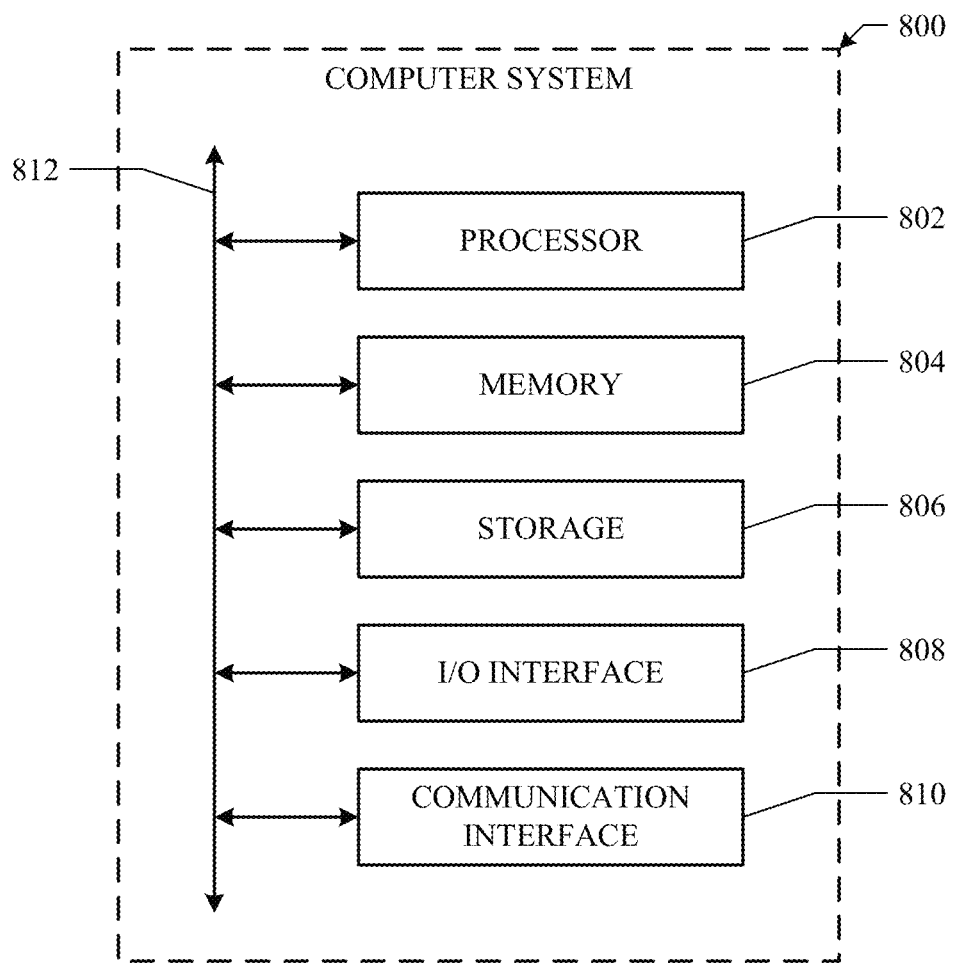
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
    determining a gaze direction of a user wearing a head-mounted device, the head-mounted device having a display configured to output an image having a plurality of pixels;
    determining a gaze location on the display based on the gaze direction of the user;
    determining, for a respective pixel of the plurality of pixels, a set of sampling locations based on the gaze location, the set of sampling locations being a portion of a sampling pattern, wherein the sampling pattern is defined relative to the gaze location and is predefined and generated by a combination of a spiral pattern and noise configured to reduce aliasing artifacts;
    computing, for the respective pixel of the plurality of pixels, a color value for the respective pixel by sampling a scene according to the set of sampling locations associated with the pixel;
    generating the image using the color value for the respective pixel of the plurality of pixels; and
    outputting the image using the display of the head-mounted device.

2. The method of claim 1, wherein the sampling pattern is fixed relative to the gaze location.

3. The method of claim 1, wherein the set of sampling locations associated with the respective pixel of the plurality of pixels is procedurally generated based on a location of the pixel and the gaze location.

4. The method of claim 1, wherein the sampling pattern is an Interleaved Gradient Noise pattern.

5. The method of claim 1, wherein the sampling pattern is a blue noise pattern or a dithering pattern.

6. The method of claim 1, wherein the gaze direction of the user is determined based on eye-tracking data captured by one or more sensors of the head-mounted device.

7. The method of claim 1, wherein determining the gaze location comprises:
    determining a gaze angle between the gaze direction and an optical axis of an eye of the user;
    determining a distance between the eye and the display along the optical axis of the eye; and
    calculating, based on the gaze angle and the distance, an offset between (1) a location on the display intersected by the optical axis of the eye and (2) the gaze location.

8. The method of claim 1, wherein the set of sampling locations associated with the respective pixel of the plurality of pixels is used for reducing aliasing artifacts in the image.

9. One or more computer-readable non-transitory storage media embodying software that is operable when executed to:
    determine a gaze direction of a user wearing a head-mounted device, the head-mounted device having a display configured to output an image having a plurality of pixels;
    determine a gaze location on the display based on the gaze direction of the user;
    determine, for a respective pixel of the plurality of pixels, a set of sampling locations based on the gaze location, the set of sampling locations being a portion of a sampling pattern, wherein the sampling pattern is defined relative to the gaze location and is predefined and generated by a combination of a spiral pattern and noise configured to reduce aliasing artifacts;
    compute, for the respective pixel of the plurality of pixels, a color value for the respective pixel by sampling a scene according to the set of sampling locations associated with the pixel;
    generate the image using the color value for the respective pixel of the plurality of pixels; and
    output the image using the display of the head-mounted device.

10. The media of claim 9, wherein the set of sampling locations associated with the respective pixel of the plurality of pixels is procedurally generated based on a location of the pixel and the gaze location.

11. The media of claim 9, wherein the gaze direction of the user is determined based on eye-tracking data captured by one or more sensors of the head-mounted device.

12. The media of claim 9, wherein determine the gaze location comprises:
    determine a gaze angle between the gaze direction and an optical axis of an eye of the user;
    determine a distance between the eye and the display along the optical axis of the eye; and calculate, based on the gaze angle and the distance, an offset between (1) a location on the display intersected by the optical axis of the eye and (2) the gaze location.

13. A system comprising:

one or more processors; and one or more computer-readable non-transitory storage media coupled to one or more of the processors and comprising instructions operable when executed by one or more of the processors to cause the system to:

determine a gaze direction of a user wearing a head-mounted device, the head-mounted device having a display configured to output an image having a plurality of pixels;

determine a gaze location on the display based on the gaze direction of the user;

determine, for a respective pixel of the plurality of pixels, a set of sampling locations based on the gaze location, the set of sampling locations being a portion of a sampling pattern, wherein the sampling pattern is defined relative to the gaze location and is predefined and generated by a combination of a spiral pattern and noise configured to reduce aliasing artifacts;

compute, for the respective pixel of the plurality of pixels, a color value for the respective pixel by sampling a scene according to the set of sampling locations associated with the pixel;

generate the image using the color value for the respective pixel of the plurality of pixels; and output the image using the display of the head-mounted device.

14. The system of claim 13, wherein the set of sampling locations associated with the respective pixel of the plurality of pixels is procedurally generated based on a location of the pixel and the gaze location.

15. The system of claim 13, wherein the gaze direction of the user is determined based on eye-tracking data captured by one or more sensors of the head-mounted device.

16. The system of claim 13, wherein determine the gaze location comprises:

determine a gaze angle between the gaze direction and an optical axis of an eye of the user;

determine a distance between the eye and the display along the optical axis of the eye; and calculate, based on the gaze angle and the distance, an offset between (1) a location on the display intersected by the optical axis of the eye and (2) the gaze location.

* * * * *